United States Patent [19]

Cluzel et al.

[11] 4,085,400

[45] Apr. 18, 1978

[54] UNDERWATER PIEZOELECTRIC TRANSDUCERS

[75] Inventors: Philippe Henri Maurice Cluzel; Michel Georges Quivy, both of Six Fours les Plages, France

[73] Assignee: Etat Francais, Paris, France

[21] Appl. No.: 678,724

[22] Filed: Apr. 20, 1976

[30] Foreign Application Priority Data

Apr. 24, 1975 France ................................ 75 12745

[51] Int. Cl.[2] ............................................ H04B 13/00

[52] U.S. Cl. .................................... 340/10; 340/12 R

[58] Field of Search .................... 340/7, 8 R, 9, 10, 11, 340/12, 13; 310/8.7, 9.6, 337

[56] References Cited

U.S. PATENT DOCUMENTS

| | | | |
|---|---|---|---|
| 2,613,261 | 10/1952 | Massa | 340/10 |
| 2,650,991 | 9/1953 | Ketchledge | 340/10 X |
| 2,877,432 | 3/1959 | Mattiat | 340/10 X |
| 2,930,912 | 3/1960 | Miller | 340/10 X |
| 3,111,595 | 11/1963 | Junger | 310/9.6 X |
| 3,217,288 | 11/1965 | Sims | 340/10 |
| 3,328,752 | 6/1967 | Sims | 340/10 |
| 3,391,385 | 7/1968 | Lubell | 340/8 R |
| 3,617,780 | 11/1971 | Benjaminson | 310/9.6 |
| 3,947,802 | 3/1976 | Tims et al. | 340/10 |

*Primary Examiner*—Harold Tudor
*Attorney, Agent, or Firm*—Haseltine, Lake & Waters

[57] ABSTRACT

A piezoelectric transducer comprising a piezoelectric cylinder whose axis is coincident with the electrical axis and placed between two rigid pistons perpendicular to the axis and of greater diameter than that of the cylinder. The pistons carry electrodes on their external faces. The external faces and the lateral faces of the pistons are acoustically decoupled such that the only faces active are the peripheral surface of the cylinder and the inner surfaces of the pistons extending beyond the peripheral surface of the cylinder.

9 Claims, 2 Drawing Figures

UNDERWATER PIEZOELECTRIC TRANSDUCERS

FIELD OF THE INVENTION

The present invention relates to piezoelectric transducers, and particularly to the construction of piezoelectric transducers utilized in underwater acoustical devices notably hydrophones of small size, of high sensitivity and of omnidirectional characteristics.

BACKGROUND OF THE INVENTION

It is known that piezoelectric materials are characterized by the existence of a vector of polarization which defines an electrical axis and by piezoelectric moduli.

The longitudinal modulus d33 is the constant relation between the density of the electrical charge $\sigma$ appearing at two electrodes disposed on two faces perpendicular to the electrical axis and a pressure P acting parallel to the electrical axis $\sigma = d33.P$.

The transverse modulus $d31$ is the relation between the density of the electrical charge $\sigma'$ appearing at two electrodes disposed on two surfaces perpendicular to the electrical axis and a pressure P' acting perpendicularly to the acoustical axis $\sigma = d31.P'$.

The hydrostatic modulus $d$H is the constant relation between the density of the electrical charge $\sigma$H appearing at two electrodes disposed on two faces perpendicular to the electrical axis and a hydrostatic pressure H acting on all of the faces $\sigma H = dH.H$.

In piezoelectric ceramics of the type of barium titanates and other alkaline earths which are generally employed, the modulus d33 is greater than the modulus d31 and of opposite sign.

The modulus dH is of the same sign as d33 but about five times weaker. In fact, when a hydrostatic pressure is applied, the effects of moduli d33 and d31, of reverse sign, are ignored.

The piezoelectric elements utilized in underwater acoustics generally have the form of discs or of cylinders of revolution whose geometric axis is coincident with the electrical axis carrying two electrodes on their plane faces perpendicular to said axis.

These elements are utilized most often in the longitudinal vibrational mode, that is to say to capture or emit acoustical waves having a direction of propagation parallel to the axis, the lateral faces being then acoutically isolated.

They are also utilized in the transverse vibratory mode to receive or emit acoustical waves propagating perpendicular to the electrical axis, the planar faces being then acoutically isolated.

The sensitivity is thus weaker when the cylindrical transducers with vertical axis are perfectly omnidirectional in bearing.

In order to increase the sensitivity of transducers operating in the longitudinal mode, there have been constructed transducers with pistons composed of one or a plurality of piezoelectric elements of section $s$ interposed between two rigid pistons whose surface S is much greater than the section $s$. The acoustical pressure which is applied on the external face of the pistons is transmitted through the internal face to the piezoelectric discs and the pressure which is exerted on these along the electrical axis is multiplied by the relation $S/s > 1$.

Hydrophones with pistons permit improvement of the sensitivity. In contrast, for more elevated frequencies, they are not omnidirectional, which limits their applications.

SUMMARY OF THE INVENTION

An object of the present invention is to provide piezoelectric transducers which have both a high sensitivity of the same order as that of piston transducers and which remain omnidirectional to high frequencies.

This object is attained by a process for emitting or receiving acoustical waves by means of a piezoelectric transducer composed of a piezoelectric element placed between two rigid pistons of a section greater than that of said element whose planar faces are perpendicular to the electrical axis of said element, and according to the invention said element is excited simultaneously in longitudinal and transverse vibratory modes, the active surfaces being solely the lateral surfaces of said piezoelectric element and the inner faces of the pistons which externally bound the said element.

This process is carried out, preferably, by means of piezoelectric transducers comprising, on the one hand, a piezoelectric cylinder of revolution around the electrical axis placed between two rigid pistons of greater section than that of said cylinder perpendicular to said axis and, on the other hand, means for acoustically decoupling the external faces and the lateral faces of the said pistons such that only the lateral face of the cylinder and the internal faces of the pistons which externally bound the cylinder receive or emit acoustical waves.

In one embodiment, the pistons are of a conductive material and constitute the electrodes.

In another embodiment, the pistons and the cylinder are made from a common block of piezoelectric material.

The result of the invention is a novel transducer and also as a novel product, a one-piece piezoelectric element constituted by a cylinder of revolution around the electrical axis interposed between two discs of much greater diameter coaxial with the said cylinder.

A transducer according to the invention has the following advantages.

The sensitivity of a hydrophone according to the invention is of the same order as that of a piston hydrophone. In fact, it is subjected simultaneously to pressures transverse to the acoustical axis which produces intervention of the transverse modulus d31 and to pressures acting on the internal faces of the pistons which tend to elongate the cylinder and therefore cause intervention of a modulus of reverse sign of d33, therefore of the same sign as d31. The effects of these two pressure therefore are additive. The capacity of a hydrophone according to the invention is identical to that of a piston hydrophone of the same size.

In contrast, for the same size as a piston transducer, the transducer according to the invention has the advantage of remaining omnidirectional to high frequencies.

It is known, in fact, that a piston transducer is omnidirectional when its greatest dimension if less, according to its applications, than the wave length or the half-wave length of the vibration corresponding to the upper limit of the frequency band. To obtain omnidirectional piston transducers for high frequencies one must therefore produce transducers of small size which pose technological problems and lead to transducers having very low sensitivity.

The transducer according to the invention with a vertical axis permits obtaining hydrophones with a vertical axis which are omnidirectional in bearing over an extended frequency band while having sufficient size to provide a high sensitivity which is proportional to the height of the transducer.

The following description refers to the annexed drawings which show an embodiment of a hydrophone according to the invention without any limiting character.

DETAILED DESCRIPTION OF THE DRAWING

Figure 1:
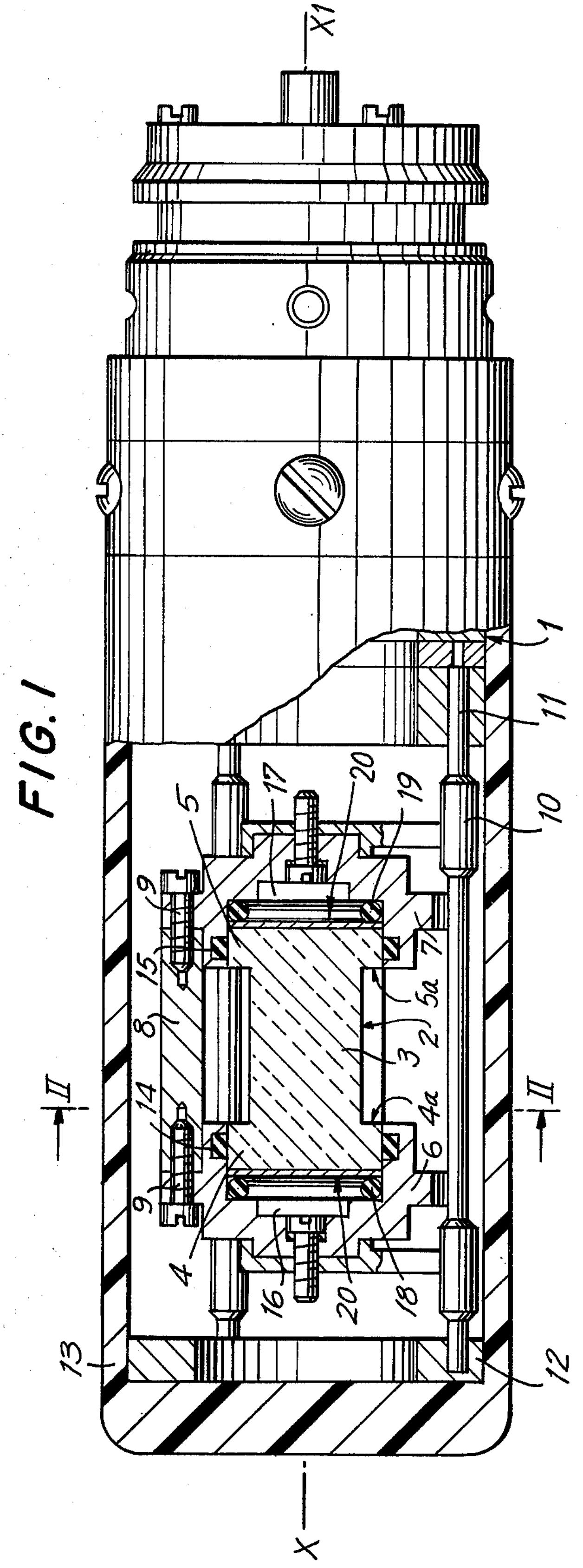
FIG. 1 is a longitudinal view partially cut away of a hydrophone according to the invention.
Figure 2:
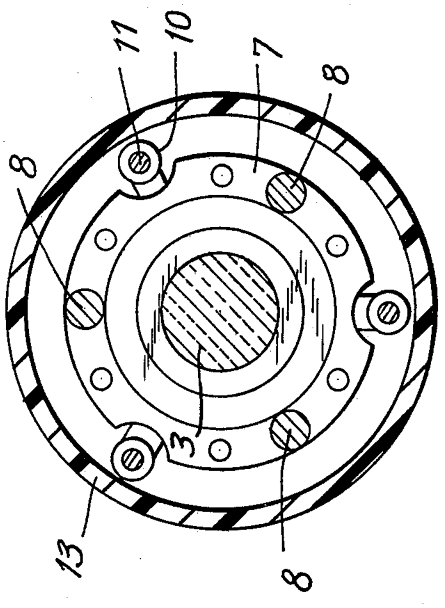
FIG. 2 is a section taken along line II—II in FIG. 1.

The drawing shows a hydrophone of revolution around an axis X-XI which is adapted to be utilized to receive acoustical waves in the water while it is suspended vertically at the extremity of a cable such that the axis X-XI is vertical. It is desired to receive waves which can come from any direction such that it is important that the hydrophone be omnidrectional in bearing.

The hydrophone is composed of a sealed casing 1 in which are disposed electronic preamplification circuits (not shown) and a piezoelectric ceramic 2 in the form of a body of revolution around the axis X-XI. The ceramic 2 is a one-piece body and comprises a cylinder portion 3 interposed between two discs or pistons 4 and 5 whose diameter is greater than that of the cylinder. The electrical axis of this ceramic is coincident with the X-XI axis.

The ceramic 2 is supported at its two extremities by two rigid flanges 6 and 7 held assembled by rigid cross-braces 8, for example, three in number which are secured to supports 6 and 7 by screws 9. The cross-braces 8 prevent the ceramic 2 from being subjected to axial compression by the forces transmitted by the support 6 and 7.

The flanges 6 and 7 are carried by flexible supports 10 mounted on rigid stems 11, for example, three in number which are fixed at one end to the casing 1. The stems 11 are fixed at their opposite ends to a ring 12 which bears against an envelope 13 of acoustically transparent material, for example, of a plastic known as p.C.

The envelope 13 is sealed and surrounds the assembly of the hydrophone including the casing such that it encloses a volume of liquid in equilibrium with the ambient medium while transmitting the acoustical waves without absorbing or reflecting them.

This type of mounting is known for underwater hydrophones and it is unnecessary to describe it in greater detail.

The novelty of the hydrophone according to the invention resides in the shape of the ceramic 2 and in the vibratory mode thereof.

The lateral and end faces of pistons 4 and 5 are entirely enveloped by the flanges 6 and 7 and seals 14 and 15 are interposed between these lateral faces and the flanges 6 and 7. The ceramic body 2 can slide in these seals. Chambers 16 and 17 containing air are formed in the interior of the flanges 6 and 7 and axial elastic abutments, for example, seals 18 and 19 are placed in these chambers.

Electrodes 20 are fixed at the outer or end faces of the pistons 4 and 5. The active faces of the ceramic 2 subjected to the acoustical waves are therefore solely the lateral surface of the cylinder 3 and the two annular surfaces 4$a$ and 5$a$ constituted by the inner surfaces of the pistons 4 and 5 which extend radially beyond the cylinder 3.

The cylinder 3 operates both in the transverse vibratory mode under the action of the pressure waves perpendicular to the axis X-XI and in the longitudinal vibratory mode under the action of pressure waves acting on the annular surfaces 4$a$ and 5$a$.

When a positive pressure H' acts on the lateral surface of the cylinder 3 it gives rise at the electrodes 20 to a density of electrical charge $\sigma'$ proportional to d31.H'.

This same positive pressure H' acting on the surfaces 4$a$ and 5$a$ exerts a force on the cylinder to elongate it which gives rise at the electrodes 20 to a density of electrical charge $\sigma''$ proportional to $-$ d33.H'. As the moduli d31 and d33 are of opposite sign the densities of charge $\sigma'$ and $\sigma''$ are added together.

If, for example, the surfaces 4$a$ and 5$a$ have a surface area equal to the section of the cylinder 3, there is thus obtained a density of charge which is greater than two times that which would be obtained with a piezoelectric cylinder without pistons operating in transverse vibratory mode.

In a variation, the pistons 4 and 5 could be constituted by metallic discs, rigid and conductive, serving as electrodes.

It is important that the discs 4 and 5 can be axially spaced such that the axial forces which are applied on the surfaces 4$a$ and 5$a$ lead to tension in the cylinder 3 which resists the forces. In the illustrated embodiment, the discs 4 and 5 merge with the cylinder 3 and form a one-piece body of piezoelectric material. The fact that the external surfaces of the discs 4 and 5 are free leads to the fact that parasitic electrical charges do not give birth in the disc, under the effect of an axial compression thereof by the pressures which are exerted on the surfaces 4$a$ and 5$a$.

By way of numerical example of the parameters obtained for a hydrophone according to the invention comprising a ceramic piezoelectric formed of a cylinder of 14mm diameter and 20mm height interposed between two discs 20mm in diameter 5mm thickness, the sensitivity Sh (reference volt/microbar) was - 80dB, the capacity was 66pF and such hydrophone was omnidirectional in bearing for frequencies up to 40 KHZ and therebeyond.

A piezoelectric ceramic of the same size and same nature interposed between two pistons of 20mm diameter and 5mm thickness has a sensitivity and a capacity of the same order of magnitude.

In contrast, in the latter case, the pressure waves are only applied on the terminal faces of the pistons and the hydrophone is only omnidirectional for frequencies below about 10 KHZ.

Of course without departing from the framework of the invention various portions of the hydrophone just described by way of example could be replaced by equivalent portions.

What is claimed is:

1. A process for emitting or receiving acoustical waves by means of a piezoelectric transducer comprising: a piezoelectric element having an electrical axis, two ends axially opposite and perpendicular to said axis, and an outer and lateral surface parallel to said axis, and two rigid discs each having an inner face and an outer face planar and parallel with each other, the surface of the faces being greater than the cross section of said piezoelectric element by a plane perpendicular to said electrical axis, each of said discs being fastened to one end of said piezoelectric element by the inner face thereof, said process comprising exciting simultaneously said piezoelectric element in both transverse and longitudinal vibratory modes, the active surfaces being only said outer and lateral surface of said piezoelectric element, said inner faces of said disks extending outwardly beyond said lateral surface of said piezoelectric element, and decoupling acoustically said outer faces and said lateral surfaces of the two discs.

2. A piezoelectric transducer comprising: a piezoelectric body of revolution around an electrical axis having two ends axially opposite and perpendicular to said axis, and an outer and lateral cylindrical surface parallel to said axis, two rigid discs, each having an inner face and an outer face planar and parallel with each other, the surface of the faces being greater than the cross section of said piezoelectric body by a plane perpendicular to said electrical axis and a lateral peripheral surface, each of said discs being fastened to an end of said piezoelectrical body by the inner face thereof so that each inner face comprises an annular surface extending outwardly beyond the lateral surface of said body, and means for acoustically decoupling said outer faces and said lateral surfaces of the two discs so that only the lateral cylindrical surface of said cylindrical body and said two annular surfaces are simultaneously acoustically excited.

3. A transducer as claimed in claim 2 comprising two rigid hollow flanges, each flange supporting one disc and enveloping the outer face and the lateral surface thereof, and means rigidly connecting said flanges to one another.

4. A transducer as claimed in claim 3 comprising seal means between said flanges and the outer peripheral surfaces of said discs permitting sealed sliding movement of said discs, said lateral surfaces of the discs being spaced from inner surfaces of the flanges to form free spaces filled with air such that the discs can slide axially in the flanges.

5. A transducer as claimed in claim 4 comprising longitudinal abutment means disposed in said free spaces.

6. A transducer as claimed in claim 4 comprising electrode means only on said outer surfaces of said discs.

7. A submergible omnidirectional hydrophone comprising a transducer as claimed in claim 3 in combination with flexible support means for said flanges, stems secured to said flexible support means and having opposite ends, a casing secured to said stems at one of the extremities thereof, said casing being adapted for underwater suspension, a ring secured to the other ends of the stems, and a flexible, sealed, envelope enclosing the assembly of the casing, transducer and ring, said envelope being transparent to acoustical waves.

8. A transducer a claimed in claim 2 wherein said discs are of a conductive material and constitute electrodes.

9. A transducer as claimed in claim 2 wherein the discs and the body are constituted of a one-piece block of piezoelectric material.

* * * * *